July 16, 1968  F. H. ADAMS  3,392,926
POWER DRIVEN WINCH

Filed Oct. 6, 1965  4 Sheets-Sheet 1

INVENTOR.
FRANK H. ADAMS
BY
ATTORNEYS

July 16, 1968

F. H. ADAMS 3,392,926

POWER DRIVEN WINCH

Filed Oct. 6, 1965

INVENTOR.
FRANK H. ADAMS
BY
Hoffmann and Yount
ATTORNEYS

July 16, 1968  F. H. ADAMS  3,392,926
POWER DRIVEN WINCH

Filed Oct. 6, 1965  4 Sheets-Sheet 4

INVENTOR
FRANK H. ADAMS
BY Hoffmann and Fount
ATTORNEYS

United States Patent Office 3,392,926
Patented July 16, 1968

3,392,926
POWER DRIVEN WINCH
Frank H. Adams, 18711 S. Woodland Ave.,
Cleveland, Ohio 44120
Filed Oct. 6, 1965, Ser. No. 493,481
13 Claims. (Cl. 242—54)

ABSTRACT OF THE DISCLOSURE

Power driven winch having positive and friction clutches selectively operable by power for connecting the winch drum to a shaft wherein the reactor for the power actuator is resilient.

---

The present invention relates to power driven winches and to power actuators for clutch and brake mechanisms of the general type employed in power driven winches or the like.

Power driven winches are in common use which include positive and friction clutches for selectively connecting and disconnecting the winch drum with a shaft for effecting rotation of the drum by power or for applying a friction drag or brake to the drum.

One of the principal objects of the present invention is the provision of a new and improved power driven winch of the character referred to comprising power operated actuating means which effects interconnection of the clutch and/or brake parts without deleterious stresses and and shocks on the actuator structure.

Another principal object of the invention is the provision of a new and improved winch of the character mentioned having power operated clutch and/or brake actuator means which is easily controlled and which has means to adjustably limit the actuating forces applied to the clutch and/or brake structures.

Another important object of the present invention is the provision of a new and improved power operated clutch and/or brake actuator for winches of the character described which can be readily installed on the winch to replace conventional manual actuating means for the clutch and/or brake.

A more specific object of the invention is the provision of a new and improved power winch of the character referred to having a motor operated clutch and/or brake actuator comprising a control member movable from a neutral position to engaged positions, the control member being moved by a power actuator supported so as to permit movement of the actuator relative to the control member, which movement is yieldingly resisted whereby the maximum forces applied to the clutch and/or brake mechanisms are limited to the resistance applied to the aforementioned reactive movements.

Another object of the invention is the provision of a new and improved winch or the like having a power actuated clutch and/or brake control of the character mentioned in which the reactive movements between the power driven control member and the power actuator is resisted by a torsion bar arranged to have torque applied thereto in opposite directions as the control member is driven in opposite directions by the actuator. Preferably, one end of the torsion bar is fixed to a suitable frame through two relatively adjustable parts to permit adjustment of the resistance of the bar.

A further object of the invention is the provision of a new and improved power operated clutch and/or brake actuator mechanism of the character mentioned having control means for the powered actuator which is responsive to predetermined movements of the control member to terminate the application of power to the control member.

A still further object of the invention is the provision of a winch or the like having a power actuated control for a clutch and/or brake mechanism of the character referred to having an electrical control system which includes limit switches which are actuated according to the movements of the control member whereby the pressure applied to the control member in either direction is automatically limited.

Other objects and advantages of the invention will be apparent from the following description of a preferred form of the invention, reference being made to the accompanying drawings in which.

Figure 1:
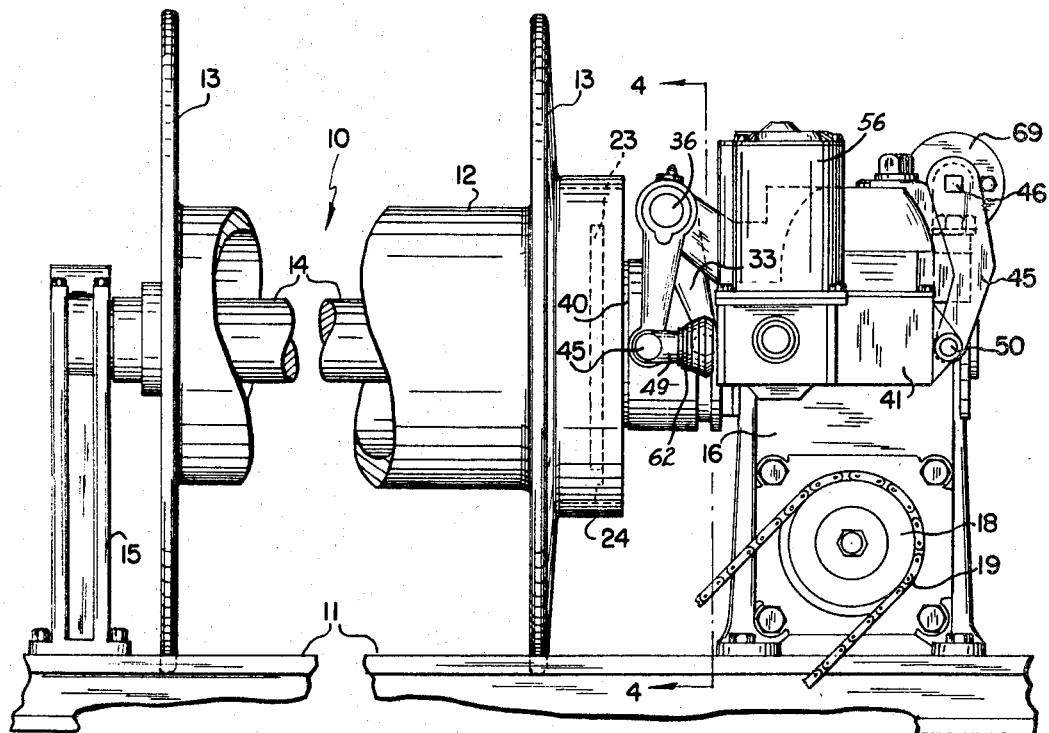
FIG. 1 is a side elevational view of a power driven winch embodying the invention, a portion of the winch being broken away.

Referring to the drawings, a power driven winch embodying the invention is shown at 10 supported on two parallel I beams 11 which are in turin installed on a motor driven truck, not shown, and which winch may be utilized to pull cables or the like, for example, during installation of underground electric or telephone services. The winch includes a drum 12 having the usual end flanges 13, and is rotatably supported on a drum shaft 14, one end of which is journalled in a standard 15 secured to the beams 11 and the other end of which is journalled in a power unit 16 supported on the beams 11. The drum 12 is rotatably supported on the shaft 14 by suitable bearing means, one of which appears at 17. The structure referred to is well known and, therefore, is not described in further detail.

The power unit 16, which is of conventional construction, includes a drive sprocket 18 driven by a chain 19 connected with a suitable power source, not shown. The sprocket 18 is drivingly connected to the drum shaft 14 through suitable reduction gearing, not shown, but which includes a locking worm and worm wheel drive, and the shaft is selectively connected to the drum 12 through clutch and brake means 23.

The clutch and brake means 23 includes a cylindrical member 24 attached to the end of the drum 12 adjacent the power unit 16 and coaxial with the shaft 14. The member 24 has an inturned flange 25 provided with internal teeth forming recesses 26 therein and forms one element of the positive clutch, the other element of which comprises a circular plate 27 having a hub 28 integral therewith, which hub is splined to the drum shaft 14 for longitudinal shifting along the shaft to cause external teeth 29 thereon, which are shaped and spaced apart to correspond with the spacing and shape of the recesses 26 of the flange 25, to mesh engage in the recesses 26 to effect a positive connection or drive between the drum 12 and the shaft 14.

The plate 27 is shifted on the shaft 14 by a collar 30 surrounding the hub 28, which collar has a groove 31 therearound which receives members 32 on the ends of an actuating yoke 33. It is apparent that when the teeth 29 of the plate 27 mesh with the recesses 26 of the drum 24 a positive driving connection is effected between the shaft 14 and the drum 12.

Figure 3:
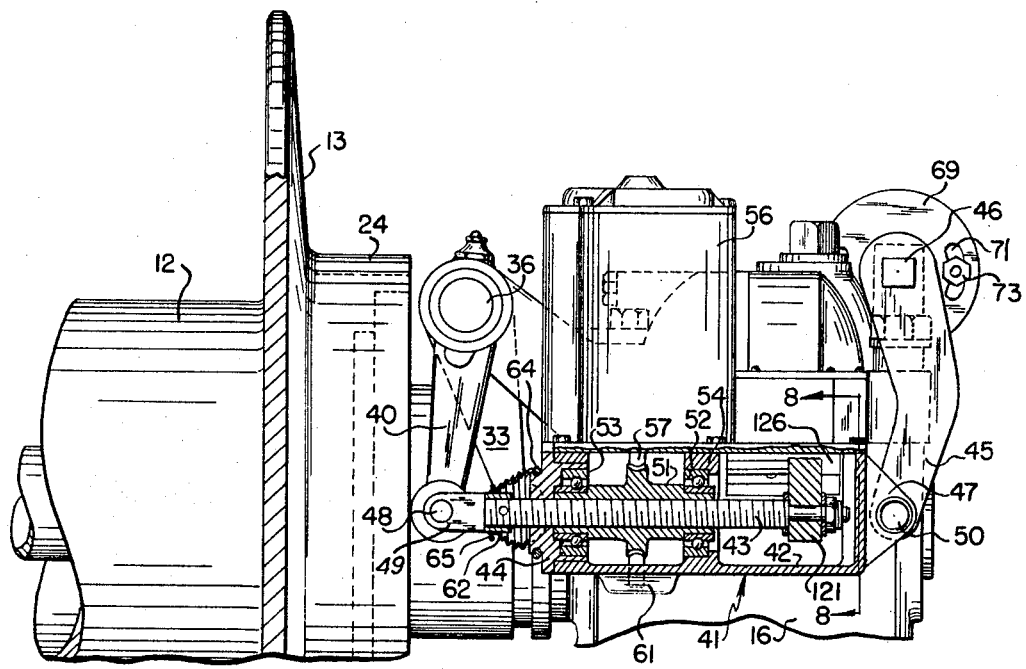
FIG. 3 is a fragmentary side view of the winch on a larger scale and showing the clutch and brake actuator partly in section taken substantially along line 3—3 of FIG. 2.
Figure 5:
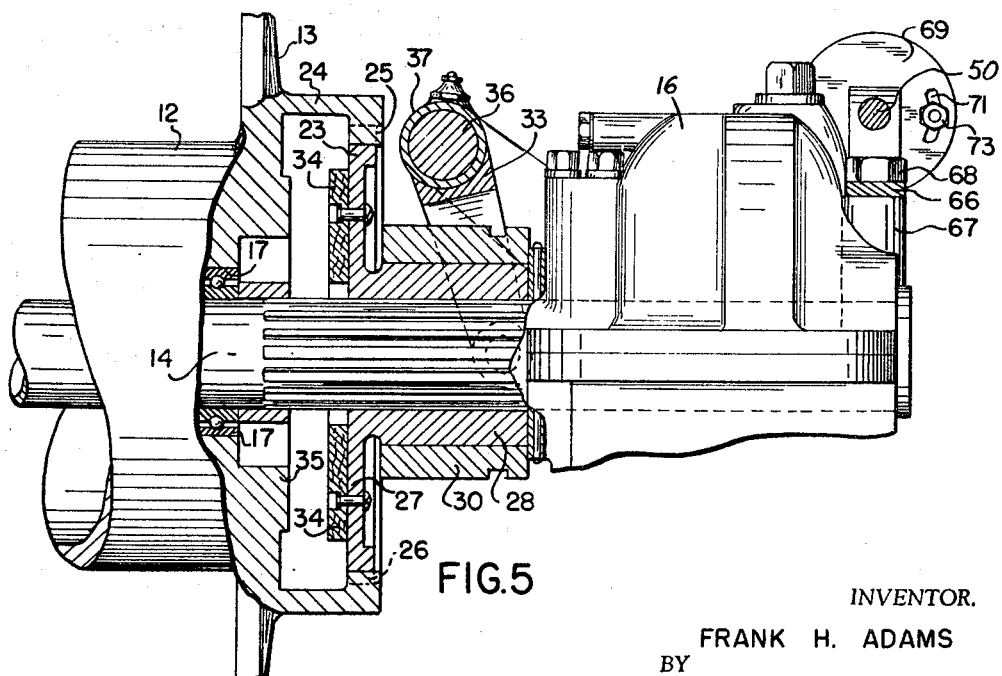
FIG. 5 is a view similar to FIG. 3, showing the clutch and brake mechanism of the winch in longitudinal section substantially along line 5—5 of FIG. 2.

An annular friction shoe 34 is riveted to the lefthand face of the plate 27 and which is adapted to engage an annular surface 35, formed on the end of the drum 12, when the plate 27 is moved to the left, as viewed in FIG. 3, along the shaft 14 by the yoke 33. The engagement of the friction shoe 34 with the surface 35 effects a frictional engagement between the drum 12 and the shaft 14 which can be used to rotate the drum from the shaft 14 or to apply a drag or brake to the drum 12 depending upon whether the shaft 14 is stationary or being driven.

The plate 27 can be positioned in a neutral position, which is intermediate the positive clutching and the friction clutching or brake applying positions and in which position the drum 12 is freely rotatable, being disengaged from all parts of the power unit.

The mechanism for actuating the plate 27 to the neutral or engaged positions mentioned comprises the U-shaped yoke 33, the central portion of which is attached to a rocking shaft 36 journalled in suitable bearings 37 supported on the housing for the power unit 16. The depending ends of the yoke 33 carry the members 32 which project inwardly and engage one or the other sides of the groove 31 in the collar 30 to shift the plate 27 in opposite directions along the drum shaft 14 when the shaft 36 is oscillated about its axis. The shaft 36 is oscillated by an arm 40 attached to one end thereof and the opposite end of which is attached to a power driven clutch and/or brake actuator device 41.

The actuator device 41 comprises a housing 42 having an actuator rod 43 therein, one end of which extends through an opening in an end wall 44 of the housing, and the rod is driven longitudinally inwardly and outwardly of the housing by an electric motor drive. The end of the rod 43 extending from the housing 42 is attached by a clevis 49 and pin 45 to the arm 40. The end of the actuator housing 42 opposite the end from which rod 43 extends is attached to an arm 46 by a pair of flanges 47 formed on the housing and having aligned openings for receiving a pin 48 which extends therethrough and through the lower end of arm 46 to pivotally attach the arm to the housing. The other or upper end of the arm 46 is connected to a torsion bar 50. If desired, the housing 42 could be reversed so that flanges 47 thereof would be attached to arm 40 and actuator rod 43 would be attached to arm 46.

The actuator rod 43 is threaded substantially throughout its length and is threaded through the hub of a worm wheel 51, the ends of which hub are journalled in antifriction bearings 52, 53 supported in openings in a partition 54 and the end wall 44 of the housing 42, respectively, the rod 43 is prevented from rotating relative to the worm wheel 51 by the clevis connection with the arm 40 so that when the worm wheel rotates relative to the rod, the rod is moved axially and relative to the housing 42.

The worm wheel 51 is driven by a reversible electric motor 56 which is attached to the upper part of the housing and which drives a shaft 57 provided with a worm gear meshing with the teeth of the worm wheel 51. The lower end of the shaft 57 is journalled in a suitable bearing 61.

To prevent the entrance of foreign matter into the housing 42 between the actuator rod 43 and the opening in the housing wall 44 through which the actuator rod extends, a metallic bellow-type flexible boot 62 is connected to an annular flange projecting from the end wall 44 by a wire 64 pressing the end portions of the boot into an annular groove formed about the flange. The opposite end of the boot is secured by a wire 65 to the clevis 49 in a similar fashion.

Figure 2:
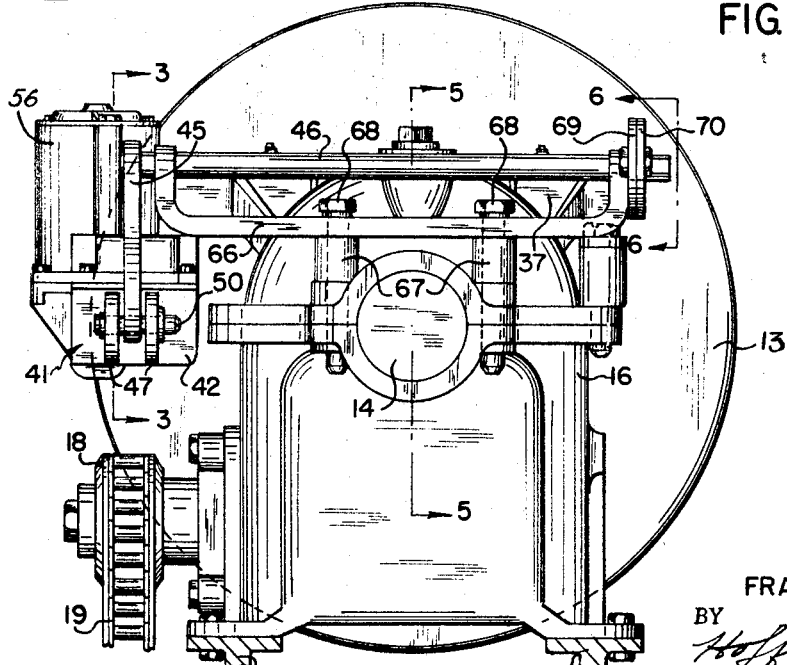
FIG. 2 is an end elevational view of the winch shown in FIG. 1.

As mentioned previously, one end of the housing 42 is connected to the arm 46 attached to one end of the torsion bar 50 which bar is supported adjacent its ends in the arms of a U-shaped bracket 66 having its yoke portion bolted to a pair of abutments 67 formed on the drive unit housing. The bracket 66 is secured to the housing by bolts 68 which are threaded into a part of the drive unit housing and which also serve to help secure two parts of the housing together. The upper ends of the arms or legs of the U-shaped bracket 66 have openings through which the torsion bar 50 extends for free rotation therein and the right-hand end of the bar, as viewed in FIG. 2, is adjustably attached to the bracket through a pair of clamp discs 69, 70. The discs 69, 70 have aligned central openings through which the bar 50 extends. Disc 69 is welded to the adjacent arm of the bracket 66 and the disc 70 is welded or otherwise secured to the torsion bar. The discs have registering arcuate slots 71 formed therein the centers of which are coaxial with the axis of the torsion bar. Clamp bolts 72 extending through the aligned slots and having nuts 73 threaded thereon provide means by which the two discs 69, 70 can be securely clamped together in a given or adjusted position relative to one another.

Assuming that the clutch actuator arm 40 is in its neutral position in which the plate 27 is intermediate the positive clutch engaged position and the drag brake applying position and it is desired to positively connect the drum shaft 14 with the winch drum 12, the motor 56 is energized to rotate in a direction to cause retraction of the actuator rod 43 into the housing 42 and in so doing a mechanical reaction between the arms 40 and 46 occurs because the actuator mechanism is supported solely by these arms. The torsion bar 50, however, restrains movement of the arm 46 so that the actuator housing 42 remains stationary and the actuator rod draws the clutch actuator arm 40 counterclockwise causing the yoke 33 to move the clutch plate 27 to a meshing position with the clutch flange 25 of the member 24. In the event the clutch teeth 29 do not initially enter or fully enter the recesses 26 in the flange 25 and the clutch plate 27 is blocked from moving into meshing position by interference of the parts of the flange 25 intermediate the teeth receiving recesses, the clutch actuator arm 40 ceases to move and the relative movement of the actuator rod and housing 42 is imparted to the arm 46 which applies torque to the torsion bar 50. An increasing yielding pressure will then be applied to the arm 40 to urge the clutch plate to the clutch engaging position by reason of the bias applied to the housing 42 by the torson bar 50. When relative rotation between the clutch elements 25, 27 occurs which it is bound to do and the teeth 29 align with the recesses 26, the pressure exerted by the torsion bar on the housing to move it in the clutch engaging direction causes complete meshing of the teeth on the plate 27 with the recesses in the flange 25. It will be appreciated that while the clutch plate actuator arm 40 is moved by the electric motor 56, the clutch parts cannot be forced together beyond the force capable of being exerted by the torsion bar 50. The tension of the bar is such that the teeth 29 of the clutch plate will be moved completely into mesh with the recesses 26 of the clutch flange 25 without excessive or deleterious pressures being applied to the clutch and their associated parts.

When a predetermined relative clutch engaging movement has occurred between the actuator rod 43 and the housing 42, the motor 56 is de-energized. When it is desired to disengage the clutch the motor 56 is actuated in the reverse direction, that is, in the direction to move the actuator rod 43 outwardly of the housing 42. As the plate 27 reaches its neutral position the motor 56 is de-energized. When it is desired to engage the drag brake the motor 56 is driven in a direction to move the actuator rod 43 outwardly of the housing 42 which results in a shifting of the plate 27 toward the surface 35 of the drum 12. As the member 34 engages the surface 35 further movement of the plate 27 towards the surface 35 is resisted thereby and continued outward movement of the actuator rod 43 will apply torque in a counterclockwise direction to the torsion bar 50 through the arm 46 and in turn a yielding pressure or force through the housing 42 and rod 43 between the member 34 and the surface 35 until the actuator rod has reached a predetermined position relative to the housing at which time the motor 56 is de-energized. It will be appreciated that the torsion bar 50 is of such construction that it yieldingly twists to limit the force applied to the drag brake members by the motor 56 to a predetermined relatively light force. The force can be adjusted by the adjusting discs 69, 70 as described hereinbefore.

As mentioned previously, a control circuit which is indicated generally at 78, is provided for controlling the actuator motor 56 so that operation of the drum 12 can be controlled by pushbutton type electrical switches 74, 75 which, for example, may be located at a convenient fixed station or at the end of cables to permit mobility of the operator. Switch 74 has a pushbutton 76 and switch 75 has a pushbutton 77 which buttons may be depressed by the operator for controlling the winch. When it is desired to engage the positive clutch, the operator depresses button 76 and when it is desired to disengage the positive clutch, button 77 is depressed until disengagement occurs. The drag brake is applied by holding button 77 depressed, and when this button is released, the clutch actuating parts return to their neutral positions.

Figure 7:
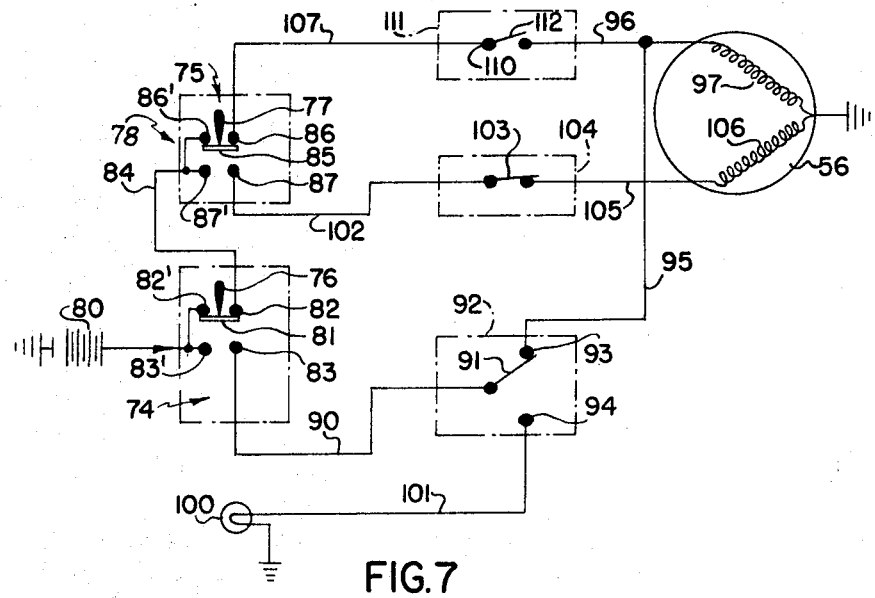
FIG. 7 is a wiring diagram of the control circuits for the clutch and brake actuator mechanism.
Figure 4:
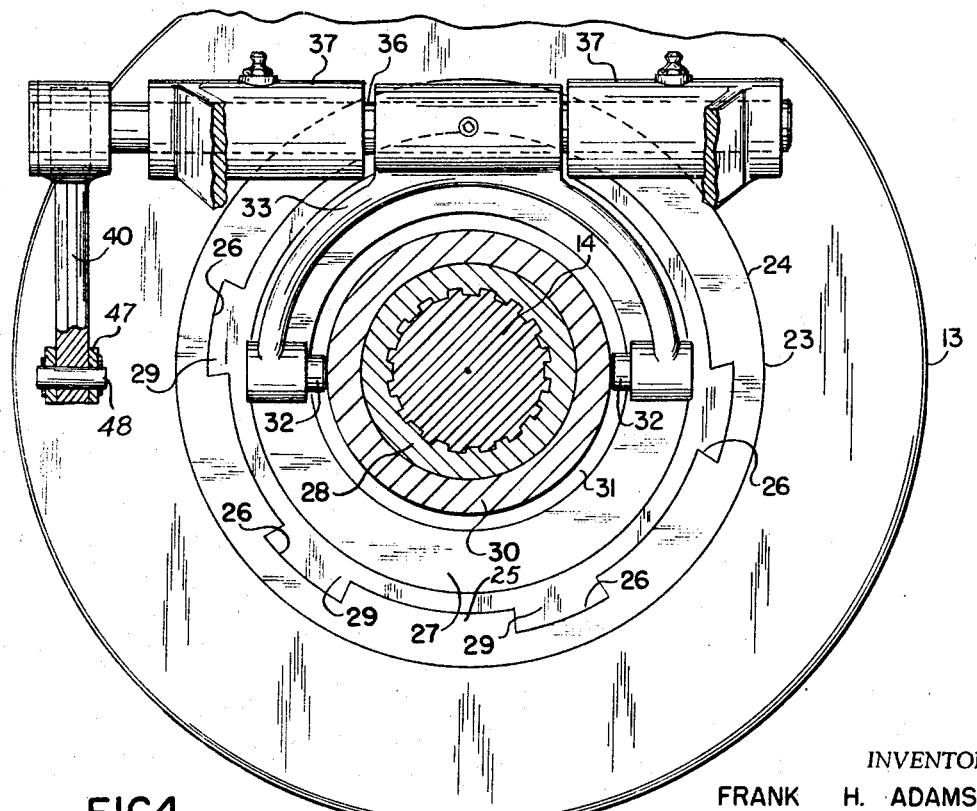
FIG. 4 is a sectional view taken substantially along line 4—4 of FIG. 1 and on a larger scale.

Referring more particularly to FIG. 7 the control system for the clutch actuator is shown diagrammatically and it includes a suitable source of power, such as a battery 80, having the positive terminal thereof connected with fixed contacts 82′ and 83′ of switch 74. A movable contact 81 of control switch 74 normally engages fixed contacts 82, 82′ but is shifted by the depression of the button 76 to engage fixed contacts 83, 83′. Contact 82 is connected by a wire 84 to fixed contacts 86′ and 87′ of switch 75. A movable contact 85 of the control switch 75 normally engaging fixed contacts 86, 86′ and is movable by the depression of the button 77 to engage fixed contacts 87, 87′.

Contact 83 of switch 74 is connected by a wire 90 to a movable contact 91 of a limit switch 92 having spaced fixed contacts 93, 94 which are alternatively engaged by the contact 91 which is normally biased to engage contact 93. The contact 91 is moved from contact 93 to contact 94 when a predetermined relative movement has occurred between the actuator rod 43 and its housing 42. Contact 93 is connected by wires 95, 96 to the forward winding 97 of the actuator motor 56, the other end of which winding is grounded.

To cause engagement of the positive clutch, control button 76 is depressed to move switch contact 81 to close on contacts 83, 83′ which establishes a circuit from battery 80 through switch contacts 81, 83, 83′, wire 90, switch contacts 91, 93 of switch 92, wires 95, 96, motor winding 97 to ground. Motor 56 is thereby energized to drive the actuator rod 43 in a direction to engage the positive clutch mechanism at which point the contact 91 of limit switch 92 is moved from contact 93 to contact 94 which opens the circuit for motor winding 97 and energizes an electric indicator lamp 100, one terminal of which is connected with the battery through a wire 101 connected to contact 94 and the other terminal of which is grounded. The lamp 100 is disposed in a convenient position to indicate to the operator that the positive clutch is engaged whereupon the operator releases button 76 which permits contact 81 to return to contacts 82, 82′; however, no change occurs in the motor circuit by the return of contact 81 to contacts 82, 82′.

To disengage the clutch and/or apply the drag brake, the operating button 77 of control switch 75 is depressed which shifts contact 85 from contacts 86, 86′ to contacts 87, 87′ thereby establishing a circuit from battery 80 through switch contacts 81, 82, 82′, wire 84, switch contacts 85, 87, 87′, a wire 102 to a movable contact 103 of a normally closed limit switch 104, a wire 105 to the reverse winding 106 of motor 56 and to ground. The motor 56 then operates the actuator causing the rod 43 to move to the clutch disengaged or neutral position and/or to the position to engage the drag brake. When the drag brake is fully applied the limit switch 104 is actuated to the open position breaking the circuit to motor winding at contact 103. The drag brake will be applied as long as button 77 is depressed.

If it is desired to merely disconnect the positive clutch, button 77 is depressed until the clutch disengages at which time the button is released by the operator and the circuit of the motor 56 is opened at contacts 85, 87, 87′. If the plate 27 has been moved towards the surface 35 beyond its neutral position the motor 56 will be automatically actuated to return the plate to its neutral position by energization of the forward winding 97 of the motor through normally closed contacts 85, 86 and 86′ of switch 75 and a limit switch 111.

Contact 86 is connected by a wire 107 with a fixed contact 110 of limit switch 111 which includes a movable contact 112 normally biased to the switch open position and which is closed, by means described hereinafter, during the time the actuator arm 40 is moved from its neutral position towards the drag brake applying position, and which movable contact is connected by the wire 96 to the forward motor winding 97. When the control button 77 of switch 75 is released contact 85 engages contacts 86, 86′ and the forward winding 97 of the motor 56 is then energized by a circuit from battery 80 through switch contacts 81, 82, 82′, wire 84, switch contacts 85, 86, 86′, wire 107, switch contacts 110, 112, and wire 96 to winding 97 which circuit energizes the motor to drive actuator rod 43 to the neutral position at which point switch contact 112 is moved from contact 110 by means described more fully hereinafter, which then opens the motor circuit.

Figure 9:
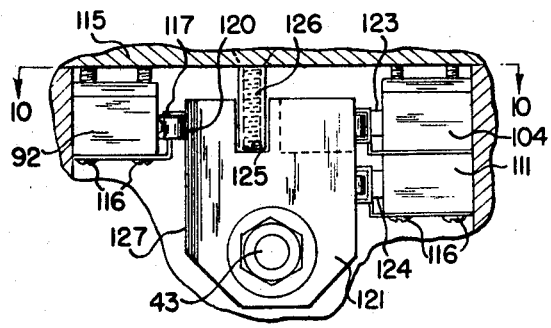
FIG. 9 is a fragmentary view of certain parts shown in FIG. 8 but on a larger scale.
Figure 8:
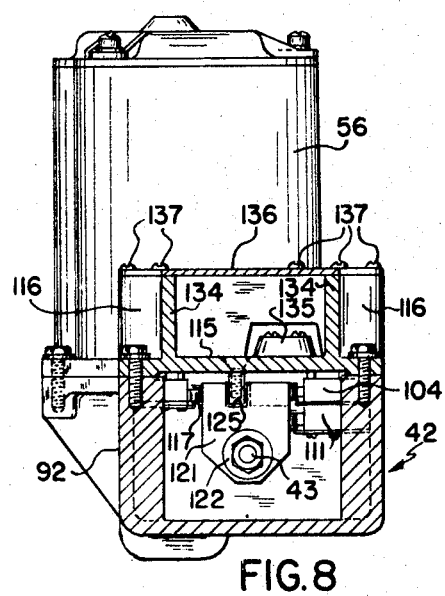
FIG. 8 is a fragmentary end view of the winch showing the actuator mechanism in section taken substantially along line 8—8 of FIG. 3 and on a larger scale.
Figure 10:
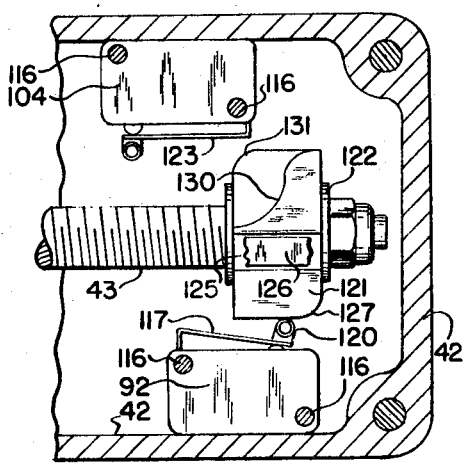
FIG. 10 is a sectional view taken substantially along line 10—10 of FIG. 9.
Figure 6:
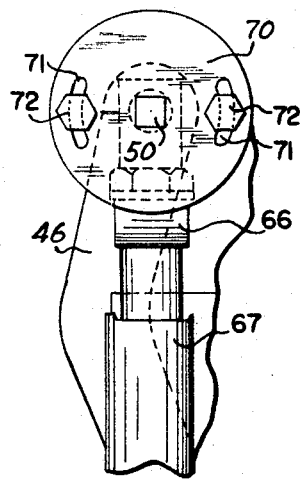
FIG. 6 is a view taken substantially along line 6—6 of FIG. 2 and on a larger scale.

Limit switches 92, 104 and 112 are of conventional form and include cases which are attached to the underside of a cover plate 115 of the actuator unit housing 42 by screws 116 extending through aligned openings through the switch housing and threaded into the cover plate. The limit switch 92 is disposed adjacent the left-hand side of the housing 42, as viewed in FIG. 9, and the limit switches 104 and 111 are located on the opposite side of the housing and in tiered relation. Limit switch 92 has an actuating arm 117 extending inwardly and which carries a roller 120 for engagement with a cam 121 attached to the actuator rod 43 by a nut and washer 122. Limit switches 104 and 111 have operating arms 123, 124, respectively, extending inwardly therefrom which each carry a roller adapted to engage cam surfaces respectively on the cam member 121.

The cam member 121 has a guide slot 125 therein which receives a guide bar 126 attached to the underside of cover plate 115 and which extends parallel to the line of movement of the actuator rod 43 to assist in guiding the rod and cam during reciprocation thereof between the limit switches 92, 104, 111.

The cam member 121 has a cam surface 127 which depresses actuator arm 117 of limit switch 92 when the actuator rod 43 and the housing 42 have moved to relative positions in which the clutch plate 27 has been urged to mesh with the clutch flange 25 with a force determined by the torsion bar 46.

The actuator arm 123 of limit switch 104 is depressed by a cam surface 130 which is formed to engage and move the actuator arm to open the switch only when the actuator rod 43 has moved relative to the housing 42 to apply the brake member 34 to the surface 35.

The limit switch 111 is actuated to its closed position by a surface 131 of the cam 121 which engages and moves the actuator arm 124 to close the switch contacts 110, 112 as the actuator rod 43 commences to move from its neutral position towards the drag brake applying position, and the switch contacts are open during the times the actuator rod is in its neutral position or is moved to the positive clutch engaging position.

The cover plate 115 has enclosure walls 134 providing a housing for a terminal block 135 by which wire connections to the various switches of the control circuit and to the motor can be conveniently effected, and which enclosure is covered by a removable plate 136 attached thereto by screws 137.

It will be seen that the invention provides a power driven winch having a motor driven actuator for the positive and clutch and drag brake thereof which is positive in operation and yet the application of forces to the parts is limited to prevent injury or excessive wear thereof, and the maximum force applied to the parts can be adjustably determined, and more particularly, a predetermined controlled drag can be applied to the drum the amount of which can be readily adjusted to provide for different operating conditions, etc. The winch can be controlled from a remote position, if desired, by simple control switches. The improved clutch actuator mechanism for the winch can be readily installed on existing equipment having manual actuating arrangements with a minimum of alteration thereof.

Although I have described but one form of the invention, it will be understood that other forms, modifications and adaptations may be made thereof all falling within the scope of the claims which follow.

I claim:

1. In a power driven winch, a control mechanism having a member movable from a neutral position to either a first position or a second position, power means for actuating said member, and means comprising a torsion bar for supporting said power means for reactive movement relative to said member and for yieldingly resisting reactive movement of said power means from said neutral position to either of said first or second positions of said member.

2. In a power operated winch having a clutch, means for actuating said clutch including control mechanism having a control element movable from a first position to a second position, power means for actuating said control element and comprising a frame member and an actuator member supported for relative movement with said frame member, drive means for moving one of said members relative to the other, means forming a yielding support element, and means for attaching one of said members to said control element and the other of said members to said support element.

3. In a power operated winch having a drive control means including a control element alternatively movable in opposite directions from a neutral position to a first position or to a second position, power means for actuating said control element and comprising a frame member and an actuator member supported on said frame member for relative movement therewith, drive means for moving said members relative to one another in opposite directions, means for attaching one of said members to said control element, and means for supporting the other of said members comprising a torsion bar tending to be rotated in opposite directions when said control element is urged from said neutral position to said first and second positions respectively.

4. In a power operated winch having a drive control means including a control element movable from a neutral position oppositely and alternatively to a first position or to a second position, power means for actuating said control element and comprising a frame member and an actuator member supported on said frame member for relative movement therewith, drive means for moving said members relative to one another in opposite directions, means for attaching one of said members to said control element, means for supporting the other of said members comprising a torsion bar tending to be rotated in opposite directions when said control element is urged from said neutral position to said first and second positions respectively, bracket means supporting said torsion bar, a radially extending member attached to said torsion bar, a member attached to said frame and extending alongside said radially extending member, and means to releasably lock said two members together to vary the torsion normally applied to said torsion bar.

5. In a power driven winch or the like including a control element movable from a first position to a second position, power means for actuating said control element, means for supporting said power means for reactive movement relative to said control element, means for yieldingly resisting said reactive movement of said power means from a position corresponding to said first position of said control element, said means for yieldingly resisting said reactive movement of said power means comprising a torsion bar, bracket means supporting said bar, means to position one end of said bar against rotation relative to said frame means, an arm attached to the other end of said bar and extending laterally therefrom and adapted to shift by rotation of said other end of said bar, and means attaching the extending end of said bar to said power means.

6. In a power driven winch or the like including a control element movable from a first position to a second position, power means for actuating said control element, means for supporting said power means for reactive movement relative to said control element, means for yieldingly resisting said reactive movement of said power means from a position corresponding to said first position of said control element, said means for yieldingly resisting said reactive movement of said power means comprising a torsion bar, bracket means supporting said bar, means to position one end of said bar against rotation relative to said frame means, an arm attached to the other end of said bar and extending laterally therefrom and adapted to shift by rotation of said other end of said bar, means attaching the extending end of said bar to said power means, and means to adjustably position said one end of said bar angularly relative to said frame.

7. In a power driven winch or the like, a frame, a winch supported on said frame, drive means for said winch including a clutch having an operating element movable from a first position to a second position for engaging and disengaging said clutch respectively, power means for moving said operating element from one of said positions to the other, said power means including a housing, an actuator member supported by said housing for movement into and out of one end of said housing, power means carried by said housing for moving said actuator member relative to said housing, spring means including an element yieldingly movable in a direction opposite to the direction of movement of said operating element from said second position to said first position, and means for connecting one of said elements to said actuator member and the other of said elements to said housing.

8. In a power driven winch or the like, a frame, a winch supported on said frame, drive means for said winch including a clutch having an operating element movable from a first position to a second position for engaging and disengaging said clutch respectively, power means for moving said operating element from one of said positions to the other, said power means including a housing, an actuator member supported by said housing for movement into and out of one end of said housing, power means including an electric motor carried by said housing for moving said actuator member relative to said housing, spring means including an element yieldingly movable in a direction opposite to the direction of movement of said operating element from said second position to said first position, means for connecting one of said elements to said actuator member and the other of said elements to said housing, and means controlling operating of said electric motor comprising switching means carried by said housing and operated by relative movement of said housing and actuator member.

9. In a power driven winch or the like, a frame, a winch supported on said frame, control means for said winch including an operating element movable from a first position to a second position, power means for moving said operating element from one of said positions to the other, said power means including a housing, an actuator member supported by said housing for movement into and out of one end of said housing, said actuator member having screw threads thereon, a nut threaded on said member and rotatably supported in said housing for moving said actuator member relative to said housing when said nut is rotated, an electric motor for driving said nut, spring means including an element yieldingly movable in a direction opposite to the direction of movement of said operating element from said second position to said first position, means for connecting one of said elements to said actuator member and the other of said elements to said housing, and means controlling said motor including switching means on said housing actuated by said actuator member.

10. In an actuator for a clutch of a power winch and the like comprising, a housing, a nut rotatably supported in said housing, a rod threaded through said nut, means for attaching one end of said rod to a supporting member, means to rotate said nut, including an electric motor, means to control said electric motor including a control circuit having switch means therein, means supporting said switch means in said housing, said switch means including an operating member, and means on said rod for engaging said operating member when said rod is in a given position with respect to said housing.

11. In a power operated winch having a drive control means including a control element movable in opposite directions from a neutral position to alternatively actuate said control means, power means for driving said control element in either direction from said neutral position, and means for supporting said power means for reactive movement relative to said control element, the last mentioned means yieldingly resisting reactive movement of said power means in opposite directions from a neutral position corresponding to said neutral position of said control element.

12. In a clutch actuator for a power winch or the like, clutch means including a control element movable in opposite directions from a neutral position to alternatively actuate said clutch means, power means for driving said control member in either direction from said neutral position, and means for supporting said power means for reactive movement relative to said control member, the last mentioned means yieldingly resisting reactive movement of said power means in opposite directions from a neutral position corresponding to said neutral position of said control member.

13. In a clutch actuator, clutch means including a control element movable in opposite directions from a neutral position to alternatively actuate said clutch means, power means for driving said control element in either direction from said neutral position, said power means comprising a frame, an actuator supported on said frame for guided movement in opposite directions relative to said frame, an electric motor on said frame, means forming a drive between said motor and said actuator whereby said motor drives said actuator in one direction or the other, means forming a support for said frame and actuator comprising a support element resisting movement thereof in opposite directions, said frame being supportingly attached to one of said elements and said actuator being supportingly attached to the other of said elements, said elements forming the sole support for said power means, and means to control the direction of operation of said motor.

References Cited
UNITED STATES PATENTS

| | | | |
|---|---|---|---|
| 2,665,113 | 1/1954 | Foster | 254—187 |
| 2,906,383 | 9/1959 | Gabriel | 192—85 |

LEONARD D. CHRISTIAN, *Primary Examiner.*